United States Patent
Ishikawa

(10) Patent No.: US 11,422,626 B2
(45) Date of Patent: Aug. 23, 2022

(54) INFORMATION PROCESSING DEVICE, AND INFORMATION PROCESSING METHOD, FOR OUTPUTTING SENSORY STIMULATION TO A USER

(71) Applicant: SONY CORPORATION, Tokyo (JP)

(72) Inventor: Tsuyoshi Ishikawa, Kanagawa (JP)

(73) Assignee: SONY CORPORATION, Tokyo (JP)

(*) Notice: Subject to any disclaimer, the term of this patent is extended or adjusted under 35 U.S.C. 154(b) by 329 days.

(21) Appl. No.: 16/343,250

(22) PCT Filed: Sep. 8, 2017

(86) PCT No.: PCT/JP2017/032519
§ 371 (c)(1),
(2) Date: Apr. 18, 2019

(87) PCT Pub. No.: WO2018/116544
PCT Pub. Date: Jun. 28, 2018

(65) Prior Publication Data
US 2021/0286432 A1 Sep. 16, 2021

(30) Foreign Application Priority Data
Dec. 19, 2016 (JP) .............................. JP2016-245395

(51) Int. Cl.
*G06F 3/01* (2006.01)
*G02B 27/01* (2006.01)
(Continued)

(52) U.S. Cl.
CPC ............ *G06F 3/016* (2013.01); *G02B 27/017* (2013.01); *G06F 3/011* (2013.01); *G06V 20/20* (2022.01);
(Continued)

(58) Field of Classification Search
CPC .......... G06F 3/016; G06F 3/011; G06F 3/014; G08B 6/00; G06K 9/00671; A63F 13/285
See application file for complete search history.

(56) References Cited

U.S. PATENT DOCUMENTS

2013/0120290 A1 5/2013 Yumiki et al.
2014/0002346 A1* 1/2014 Weddle ............... G06F 3/04883
345/156
(Continued)

FOREIGN PATENT DOCUMENTS

CN 105843278 A 8/2016
EP 2902879 A1 8/2015
(Continued)

OTHER PUBLICATIONS

YouTube video by user Wilcoxson, "Nokia Phone Vibrating Around," dated Jul. 30, 2009, downloaded from https://www.youtube.com/watch?v=Y6rXYispsXs (Year: 2009).*
(Continued)

*Primary Examiner* — Eric J Yoon
(74) *Attorney, Agent, or Firm* — Chip Law Group

(57) ABSTRACT

Provided are an information processing device and an information processing method capable of controlling display of an image adapted to contents of control relating to output of sensory stimulation. The information processing device includes an output control unit that controls the display of the image corresponding to control information with respect to a first output unit that outputs the sensory stimulation to a user.

17 Claims, 12 Drawing Sheets

(51) Int. Cl.
*G08B 6/00* (2006.01)
*G06V 20/20* (2022.01)

(52) U.S. Cl.
CPC .......... *G08B 6/00* (2013.01); *G02B 2027/014* (2013.01); *G02B 2027/0138* (2013.01)

(56) References Cited

U.S. PATENT DOCUMENTS

| | | | |
|---|---|---|---|
| 2014/0208272 A1* | 7/2014 | Vats | G06T 19/20 715/852 |
| 2015/0209668 A1 | 7/2015 | Obana et al. | |
| 2015/0227210 A1 | 8/2015 | Chen et al. | |
| 2015/0356838 A1 | 12/2015 | Obana et al. | |
| 2016/0067743 A1 | 3/2016 | Tanaka et al. | |
| 2016/0093107 A1* | 3/2016 | Yamamoto | A63F 13/212 345/633 |
| 2016/0187899 A1* | 6/2016 | Lee | G05D 22/02 236/44 C |
| 2016/0274662 A1* | 9/2016 | Rimon | G06F 3/016 |
| 2017/0154506 A1 | 6/2017 | Obana et al. | |

FOREIGN PATENT DOCUMENTS

| | | |
|---|---|---|
| JP | 2013-122750 A | 6/2013 |
| JP | 2015-141647 A | 8/2015 |
| JP | 2015-162152 A | 9/2015 |
| JP | 2015-170174 A | 9/2015 |
| JP | 2015-232786 A | 12/2015 |
| WO | 2014/061310 A1 | 4/2014 |
| WO | 2014/203960 A1 | 12/2014 |

OTHER PUBLICATIONS

International Search Report and Written Opinion of PCT Application No. PCT/JP2017/032519, dated Nov. 14, 2017, 09 pages of ISRWO.

"Top 10 Android Music Equalizer to Get the Best Out of Audio", TIPARD Multimedia Solution Expert, XP055619440, Dec. 14, 2016, 11 pages.

Office Action for EP Patent Application No. 17883645.8 dated Jul. 5, 2021, 07 pages of Office Action.

* cited by examiner

INFORMATION PROCESSING DEVICE, AND INFORMATION PROCESSING METHOD, FOR OUTPUTTING SENSORY STIMULATION TO A USER

CROSS REFERENCE TO RELATED APPLICATIONS

This application is a U.S. National Phase of International Patent Application No. PCT/JP2017/032519 filed on Sep. 8, 2017, which claims priority benefit of Japanese Patent Application No. JP 2016-245395 filed in the Japan Patent Office on Dec. 19, 2016. Each of the above-referenced applications is hereby incorporated herein by reference in its entirety.

TECHNICAL FIELD

The present disclosure relates to an information processing device, an information processing method, and a program.

BACKGROUND ART

In related art, various techniques have been provided for presenting, in one example, tactile stimulation such as vibration to a user.

In one example, Patent Literature 1 below discloses a technique of controlling output of sound or tactile stimulation depending on granularity information of a contact surface between two objects in a case where the objects are relatively moved in a state in which the objects are in contact with each other in the virtual space.

CITATION LIST

Patent Literature

Patent Literature 1: JP 2015-170174A

DISCLOSURE OF INVENTION

Technical Problem

The technique disclosed in Patent Literature 1 however remains the displayed picture unchanged even in a case of varying contents of control relating to output of sound or tactile stimulation.

In view of this, the present disclosure provides a novel and improved information processing device, information processing method, and program, capable of controlling display of an image adapted to contents of control relating to output of sensory stimulation.

Solution to Problem

According to the present disclosure, there is provided an information processing device including: an output control unit configured to control display of an image corresponding to control information with respect to a first output unit configured to output sensory stimulation to a user.

Moreover, according to the present disclosure, there is provided an information processing method including: controlling, by a processor, display of an image corresponding to control information with respect to a first output unit configured to output sensory stimulation to a user.

Moreover, according to the present disclosure, there is provided a program causing a computer to function as: an output control unit configured to control display of an image corresponding to control information with respect to a first output unit configured to output sensory stimulation to a user.

Advantageous Effects of Invention

According to the present disclosure as described above, it is possible to control display of an image adapted to contents of control relating to output of sensory stimulation. Moreover, the effects described herein are not necessarily limited, and any of the effects described in the present disclosure may be applied.

MODE(S) FOR CARRYING OUT THE INVENTION

Figure 1:
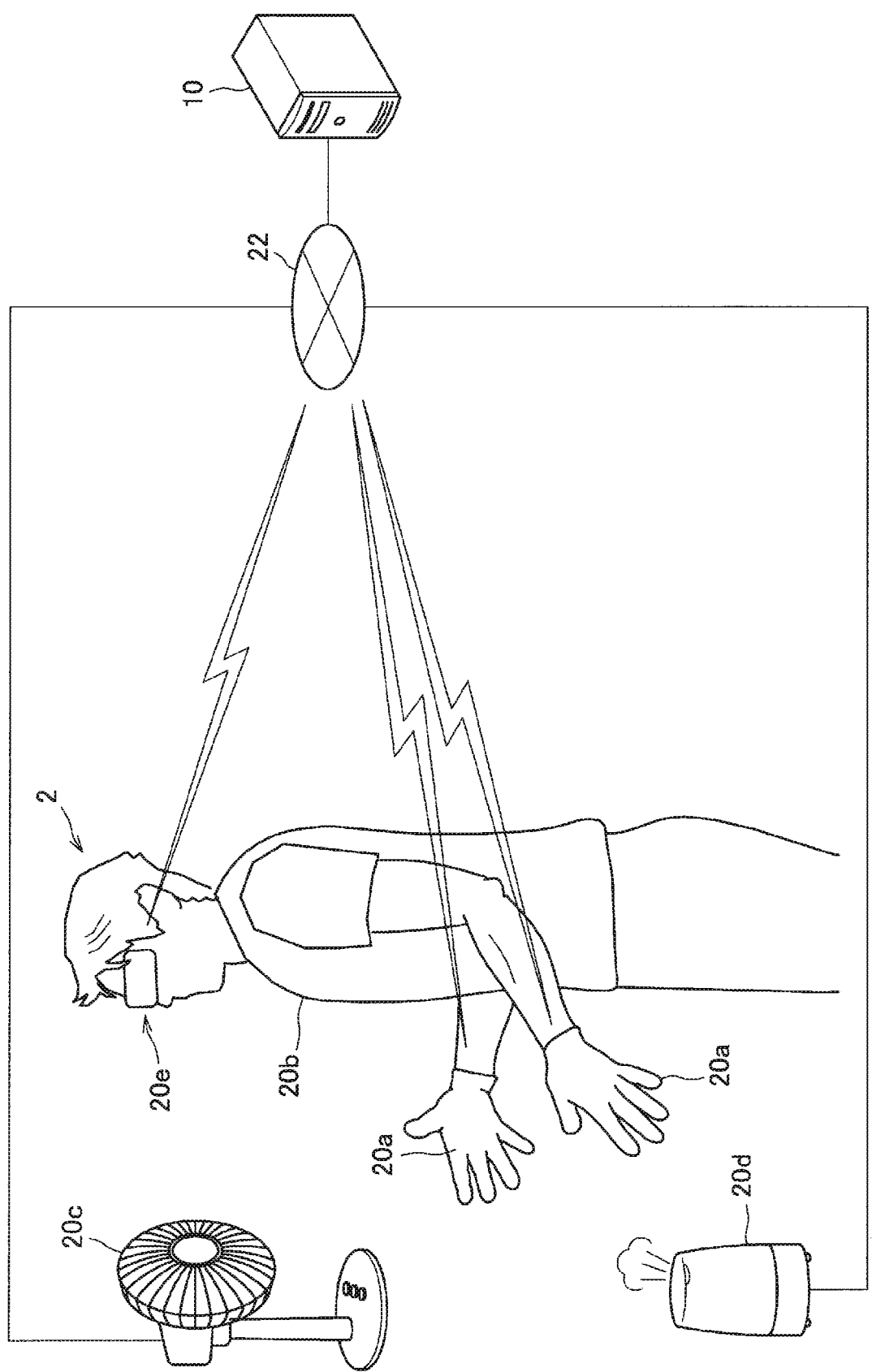
FIG. 1 is a diagram illustrated to describe a configuration example of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, there are cases in the present specification and the diagrams in which a plurality of components having substantially the same functional configuration are distinguished from each other by affixing different letters to the same reference numbers. In one example, a plurality of components having substantially identical functional configuration are distinguished, like a stimulation output unit 20a and a stimulation output unit 20b, if necessary. However, when there is no particular need to distinguish a plurality of components having substantially the same functional configuration from each other, only the same reference number is affixed thereto. In one example, when there is no particular need to distinguish the stimulation output unit 20a and the stimulation output unit 20b, they are referred to simply as a stimulation output unit 20.

Further, the "modes for carrying out the invention" will be described in the order of items shown below.
1. Configuration of information processing system
2. Detailed description of embodiment
3. Hardware configuration
4. Modifications 1. Configuration of Information Processing System The configuration of an information processing system according to an embodiment of the present disclosure is now described with reference to FIG. 1. As illustrated in FIG. 1, the information processing system according to the present embodiment includes an information processing device 10, a plurality of types of stimulation output units 20, and a communication network 22.

<1-1. Stimulation Output Unit 20>

The stimulation output unit 20 is an example of a first output unit and a second output unit in the present disclosure. The stimulation output unit 20 may be, in one example, a device used to present a predetermined sensation to a user. In one example, the stimulation output unit 20 outputs stimulation relating to skin sensation, visual sensation, auditory sensation, and/or olfactory sensation depending on output control information received from the information processing device 10 described later. Here, the skin sensation may include, in one example, tactile sensation, pressure sensation, thermal sensation, and pain sensation. Moreover, the stimulation relating to skin sensation is hereinafter referred to as tactile stimulation. In one example, the stimulation output unit 20 can generate vibration (as tactile stimulation) or heat.

{1-1-1. Tactile Stimulation Units 20a to 20c}

In one example, as illustrated in FIG. 1, the stimulation output unit 20 can include a tactile stimulation unit 20a (e.g., a glove with an actuator) and a tactile stimulation unit 20b (e.g., a jacket with an actuator).

As illustrated in FIG. 1, the tactile stimulation unit 20a and the tactile stimulation unit 20b can be attached to a user (e.g., user's hand or body, etc.). In this case, the tactile stimulation unit 20 can output tactile stimulation to a portion to which the tactile stimulation unit 20 is attached. In one example, in a case where it is determined that an object is displayed on an HMD 20e described later and the user touches the object, the tactile stimulation unit 20 outputs tactile stimulation depending on output control information received from the information processing device 10 as feedback (or response) to the fact that the user touches the object.

Figure 2:
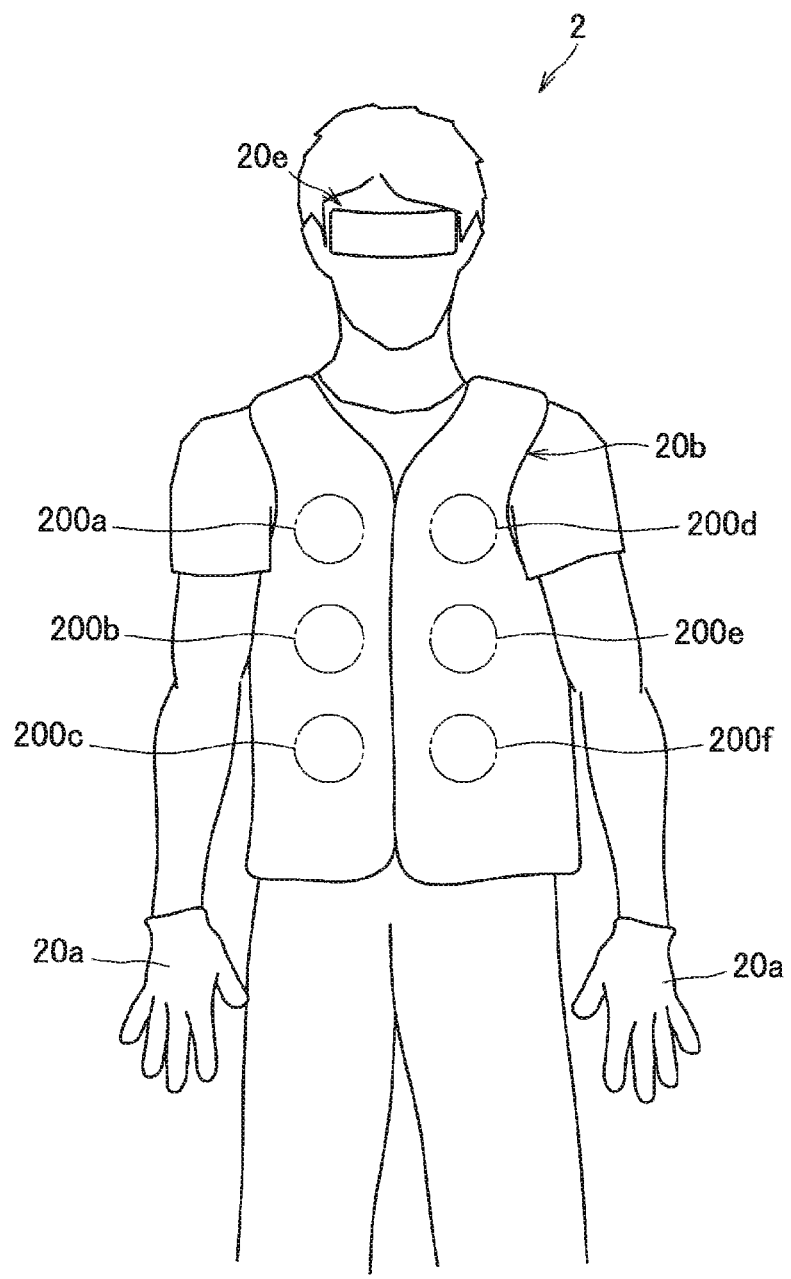
FIG. 2 is a diagram illustrating an example of an external appearance of the front face of a user 2 illustrated in FIG. 1.

FIG. 2 is a diagram illustrating an example of the external appearance of the front face of a user 2 illustrated in FIG. 1. As illustrated in FIG. 2, the tactile stimulation unit 20b can include a plurality of actuators 200. In this case, each of the actuators 200 can output tactile stimulation (such as vibration) depending on, in one example, output control information received from the information processing device 10. This makes it possible for the user 2 to feel tactile sensation, haptic sensation, thermal sensation, or pain sensation presented by the tactile stimulation unit 20b.

Further, as illustrated in FIG. 1, the stimulation output unit 20 may include a tactile stimulation unit 20c (such as an electric fan or an air conditioner). The tactile stimulation unit 20c can generate wind depending on, in one example, output control information received from the information processing device 10. Here, wind is an example of tactile stimulation. Moreover, the tactile stimulation units 20a to 20c may be collectively referred to as the tactile stimulation unit 20 in some cases.

{1-1-2. Olfactory Stimulation Unit 20d}

Further, as illustrated in FIG. 1, the stimulation output unit 20 can include an olfactory stimulation unit 20d. The olfactory stimulation unit 20d may generate a scent (odor). Here, the scent is an example of stimulation relating to olfactory sensation.

{1-1-3. HMD 20e}

Further, as illustrated in FIG. 1, the stimulation output unit 20 can include a head-mounted display (HMD) 20e. The HMD 20e is, in one example, a head-mounted device as illustrated in FIG. 1. The HMD 20e can include a display unit and a sound output unit.

The HMD 20e may be a light-shielding head-mounted display or a light-transmission head-mounted display. In one example, the HMD 20e can be an optical see-through device. In this case, the HMD 20e can have left-eye and right-eye lenses (or a goggle lens) and a display unit. Then, the display unit can project a picture using at least a partial area of each of the left-eye and right-eye lenses (or at least a partial area of a goggle lens) as a projection plane.

Alternatively, the HMD 20e can be a video see-through device. In this case, the HMD 20e can include a camera for capturing the front of the user wearing the HMD 20e and a display unit for displaying the picture captured by the camera. In one example, the HMD 20e can sequentially display pictures captured by the camera on the display unit. This makes it possible for the user to view the scenery ahead of the user via the picture displayed on the display unit. Moreover, the display unit can be configured as, in one example, a liquid crystal display (LCD), an organic light emitting diode (OLED), or the like.

The HMD 20e is capable of displaying a picture or outputting sound depending on, in one example, the output control information received from the information processing device 10. Here, the picture is an example of stimulation relating to visual sensation, and the sound is an example of stimulation relating to auditory sensation.

In one example, the HMD 20e displays a picture including an object depending on the output control information received from the information processing device 10. Here, the object includes a virtual object or a real object. Moreover, in a case where the object is a real object, the image in which the real object is captured can be displayed on the HMD 20e. In addition, in one example, attribute information of the real object (e.g., type of object, size of object in the image, texture information of object, etc.) can be specified on the basis of a result obtained by performing image recognition on the image in which the real object is captured.

Further, the virtual object includes, in one example, 3D data generated by computer graphics (CG), 3D data obtained from a sensing result of a real object, or the like. Moreover, the description below is given focusing on an example in which the object is a virtual object.

{1-1-4. Sensing Movement of User}

Further, the stimulation output unit 20 (e.g., the tactile stimulation unit 20a, the tactile stimulation unit 20b, the HMD 20e, etc.) can have various sensors such as an acceleration sensor or a gyroscope. In this case, the stimulation output unit 20 is capable of sensing movement of the user's body (e.g., movement of the hand). In addition, the stimulation output unit 20 is capable of transmitting a sensing result as motion information of the user to the information processing device 10 via the communication network 22. In addition, in a case where a camera is installed in the HMD 20e, the camera captures an image of the user's body (e.g., hand, etc.), and the HMD 20e is also capable of transmitting the captured image to the information processing device 10.

<1-2. Information Processing Device 10>

The information processing device 10 is an example of the information processing device according to the present disclosure. The information processing device 10 controls, in one example, the operation of the stimulation output unit 20 via a communication network 22 described later. In one example, the information processing device 10 causes the HMD 20e to display a picture relating to a virtual reality (VR) or augmented reality (AR) application. In addition, the information processing device 10 causes the tactile stimulation unit 20a to output predetermined tactile stimulation at a predetermined timing (e.g., at display of an image by the HMD 20e, etc.).

Here, the information processing device 10 can be, in one example, a server, a general-purpose personal computer (PC), a tablet terminal, a game machine, a mobile phone such as smartphones, a portable music player, a robot, or the like. Moreover, although only one information processing device 10 is illustrated in FIG. 1, it is not limited to this example, and the function of the information processing device 10 according to the present embodiment may be implemented by a plurality of computers operating in cooperation.

<1-3. Communication Network 22>

The communication network 22 is a wired or wireless transmission channel of information transmitted from a device connected to the communication network 22. In one example, the communication network 22 may include a public network such as telephone network, the Internet, satellite communication network, various local area networks (LANs) including Ethernet (registered trademark), a wide area network (WAN), or the like. In addition, the communication network 22 may include a leased line network such as Internet protocol-virtual private network (IP-VPN).

Moreover, the information processing system according to the present embodiment is not limited to the example described above. In one example, a sound output unit 20 (such as a loudspeaker) may be further installed in the real space in which the user is located, or the user may further wear the sound output unit 20 (such as stereophone or earphone). In this case, the sound output unit 20 can output sound depending on the output control information received from the information processing device 10 (in place of the HMD 20e, or together with the HMD 20e).

<1-4. Summary of Problems>

The configuration of the information processing system according to the present embodiment is described above. Meanwhile, techniques for presenting desired skin sensation to a user have been studied. However, there can be a danger to the human body depending on the degree of skin sensation presented. In one example, in a case where the temperature presented is high, the user is likely to get burned, or in a case where the pressure presented is strong, the user is likely to be injured.

As another problem, it is desirable that sensation of different intensity can be presented depending on a target user. In one example, in a case where the target user is a child and the target user is a specialized operator, it is desirable that sensation (such as skin sensation) of different intensity can be presented.

Thus, considering the above circumstances as one point of view, the information processing device 10 according to the present embodiment is devised. The information processing device 10 is capable of converting original sensory stimulation corresponding to the virtual object displayed on the HMD 20e using a conversion technique determined on the basis of a predetermined criterion and is capable of causing the stimulation output unit 20 to output the converted sensory stimulation. Thus, it is possible to present an appropriate degree of sensory stimulation to the user.

Further, the information processing device 10 is capable of controlling display, by the stimulation output unit 20, of an additional image corresponding to control information relating to output of sensory stimulation. This makes it possible to control display of the additional image adapted to contents of control relating to the output of sensory stimulation. Here, the additional image is an example of an image according to the present disclosure.

2. Detailed Description of Embodiment

<2-1. Configuration>

Figure 3:
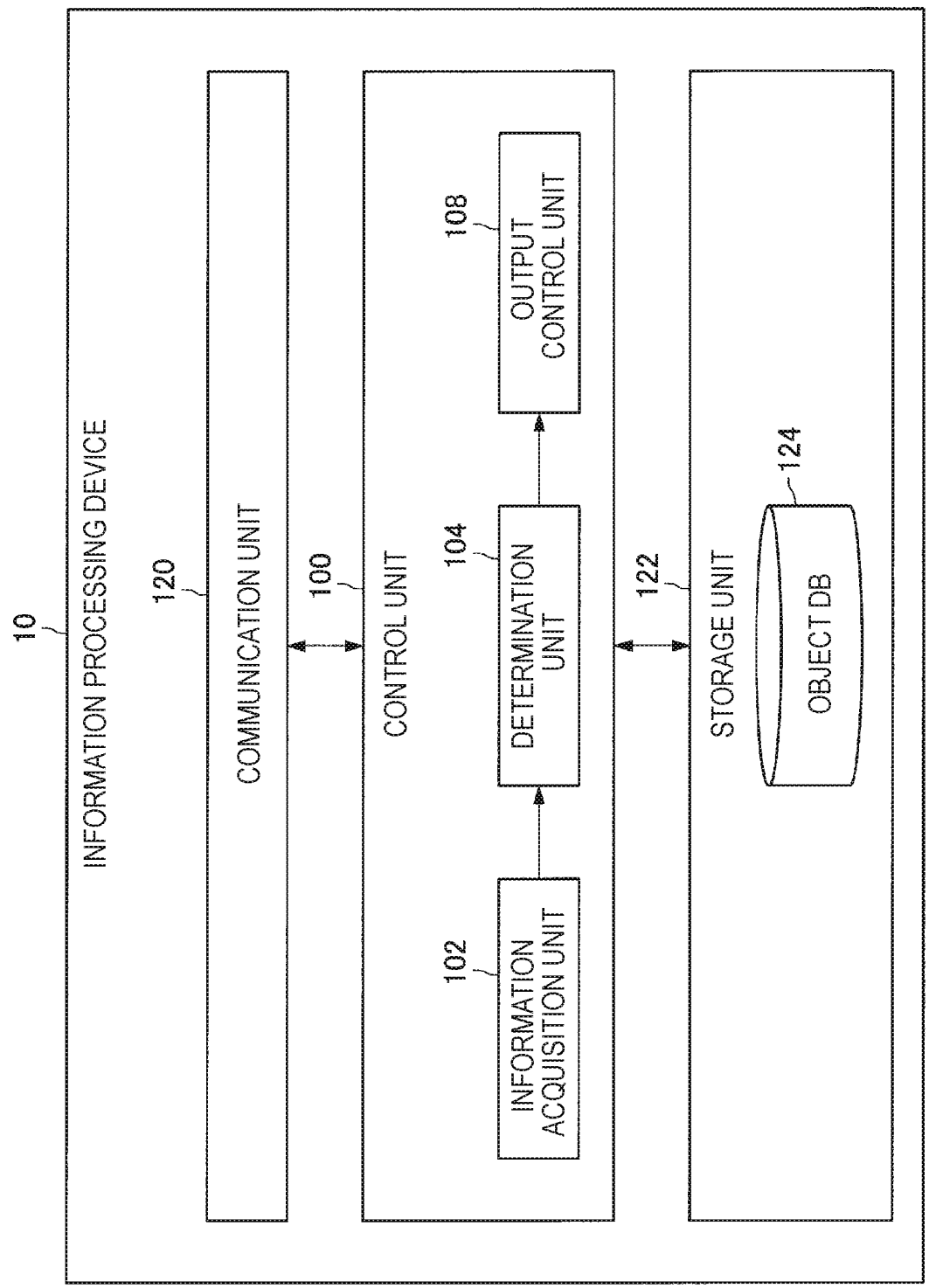
FIG. 3 is a functional block diagram illustrating a configuration example of an information processing device 10 according to the present embodiment.

The configuration of the information processing device 10 according to the present embodiment is now described in detail. FIG. 3 is a functional block diagram illustrating a configuration example of the information processing device 10 according to the present embodiment. As illustrated in FIG. 3, the information processing device 10 includes a control unit 100, a communication unit 120, and a storage unit 122.

{2-1-1. Control Unit 100}

The control unit 100 may include, in one example, processing circuits such as a central processing unit (CPU) 150 described later or a graphic processing unit (GPU). The control unit 100 performs comprehensive control of the operation of the information processing device 10. In addition, as illustrated in FIG. 3, the control unit 100 includes an information acquisition unit 102, a determination unit 104, and an output control unit 106.

{2-1-2. Information Acquisition Unit 102}

(2-1-2-1. Acquisition of Motion Information)

The information acquisition unit 102 acquires motion information of the user. In one example, in a case where the motion information is sensed by the tactile stimulation unit 20, the information acquisition unit 102 acquires the motion information received from the tactile stimulation unit 20. Alternatively, in a case of receiving a sensing result obtained by another sensor (e.g., a camera installed in the HMD 20e, etc.) worn by the user or another sensor (such as camera) installed in the real space where the user is located, the information acquisition unit 102 may analyze the sensing result (e.g., image recognition, etc.) and may acquire the analyzed result as the motion information of the user.

In one example, the information acquisition unit 102 acquires, from the tactile stimulation unit 20, the motion information of the user with respect to a virtual object in displaying the virtual object by the HMD 20e. As an example, the information acquisition unit 102 acquires, from the stimulation output unit 20, a sensing result of the action of the user who touches the virtual object displayed on the HMD 20*e* as the motion information.

(2-1-2-2. Acquisition of Attribute Information of Virtual Object)

Further, the information acquisition unit 102 acquires attribute information of the virtual object displayed on the HMD 20*e*. In one example, a producer determines attribute information for each virtual object in advance and then the virtual object and the attribute information can be registered in an object DB 124 in association with each other. In this case, the information acquisition unit 102 can acquire the attribute information of the virtual object displayed on the HMD 20*e* from the object DB 124.

Here, the object DB 124 is, in one example, a database that stores identification information of the virtual object and the attribute information of the virtual object in association with each other. In addition, the attribute information can include, in one example, texture information (e.g., type of texture) associated with individual faces included in the virtual object. Moreover, texture information may be produced by the producer or may be specified on the basis of image recognition on an image in which a real object corresponding to the virtual object is captured. Here, the image recognition can be performed by using techniques such as machine learning or deep learning.

{2-1-3. Determination Unit 104}

(2-1-3-1. Determination of Movement of User)

The determination unit 104 determines the user's movement to the virtual object displayed on the HMD 20*e* on the basis of the motion information acquired by the information acquisition unit 102. In one example, the determination unit 104 determines whether or not the user touches or approaches the virtual object displayed on the HMD 20*e* (e.g., whether or not the user is touching) on the basis of the acquired motion information. In one example, the determination unit 104 determines whether or not the user touches the virtual object on the basis of a distance between faces included in the virtual object and the user's body. In one example, in a case where the distance between any faces included in the virtual object and the user's body is within a predetermined threshold value, the determination unit 104 determines that the user touches the face of the virtual object. On the other hand, in a case where the distance between all the faces included in the virtual object and the user's body is larger than the predetermined threshold value, the determination unit 104 determines that the user does not touch the virtual object.

Further, in a case where it is determined that the user touches the virtual object, the determination unit 104 further determines how the user touches the virtual object. Here, how the user touches includes, in one example, strength to touch, speed of touching, direction to touch, or the like.

(2-1-3-2. Specifying Original Sensory Stimulation)

Further, the determination unit 104 is capable of further specifying the information of original sensory stimulation (i.e., initial sensory stimulation) depending on the virtual object displayed on the HMD 20*e*. In one example, the virtual object and the information of the original sensory stimulation (e.g., stimulation relating to visual, auditory, or olfactory sensation, etc.) can be stored in a predetermined table in association with each other. In this case, the determination unit 104 can specify the information of original sensory stimulation for each virtual object currently displayed on the HMD 20*e* on the basis of the virtual object and the predetermined table. Here, the information of original sensory stimulation can include, in one example, the type of sensory stimulation, the intensity of sensory stimulation (e.g., luminance, sound volume, etc.), or the like. Moreover, the predetermined table may be the object DB 124.

Further, in a case where it is determined that the user touches the virtual object displayed on the HMD 20*e*, the determination unit 104 is capable of specifying the information of original tactile stimulation depending on how the user touches the virtual object. In one example, the texture information and the information of original tactile stimulation can be stored in a predetermined table in association with each other. In this case, the determination unit 104 can first specify the texture information of the face that the user touches, among the faces included in the virtual object displayed on the HMD 20*e*. Then, the determination unit 104 can specify the information of original tactile stimulation on the basis of the texture information of the specified face, how the user touches the face, and the predetermined table. Moreover, the predetermined table may be the object DB 124.

Modification 1

Moreover, as a modification, the texture information and the original skin sensation information may be not necessarily associated with each other. In this case, the information processing device 10 (the control unit 100 thereof) first may acquire, for each face included in the virtual object displayed on the HMD 20*e*, sound data associated with the texture information of the face and then dynamically generate the original skin sensation information on the basis of the acquired sound data and a known technique. Moreover, other device (not shown) connected to the communication network 22 or the storage unit 122 can store individual pieces of texture information and sound data in association with each other.

Modification 2

Further, as another modification, the virtual object and the information of original sensation (e.g., skin, visual, auditory, or olfactory sensation) may be stored in a predetermined table in association with each other. In this case, the determination unit 104 may specify information of original sensation on the basis of the virtual object and the predetermined table for each virtual object currently displayed on the HMD 20*e*. Then, the determination unit 104 may specify sensory stimulation corresponding to the specified original sensation as the original sensory stimulation.

{2-1-4. Output Control Unit 106}

(2-1-4-1. Control of Display of Virtual Object)

The output control unit 106 controls, in one example, display of the picture including the virtual object by the HMD 20*e*. In one example, the output control unit 106 causes the communication unit 120 to transmit display control information used to display the picture to the HMD 20*e*.

(2-1-4-2. Control of Output of Sensory Stimulation)

Further, the output control unit 106 controls the output of sensory stimulation by the stimulation output unit 20. In one example, the output control unit 106 first generates output control information used to output predetermined sensory stimulation and then causes the communication unit 120 to transmit the output control information to the stimulation output unit 20 capable of outputting the predetermined sensory stimulation. As an example, in the case where the determination unit 104 determines that the user touches the virtual object displayed on the HMD 20*e*, the output control unit 106 generates output control information for causing the tactile stimulation unit 20 to output tactile stimulation corresponding to feedback (or response) of the fact that the user touches the virtual object.

(2-1-4-3. Conversion of Sensory Stimulation)

Here, the output control information can be information used to cause the stimulation output unit 20 to output sensory stimulation (hereinafter referred to as actual sensory stimulation) in which the information of original sensory stimulation corresponding to the virtual object displayed on the HMD 20e is converted (suppressed or enhanced) on the basis of a predetermined conversion technique. In other words, the output control information may be regarded to include the output amount of sensory stimulation. Moreover, the original sensory stimulation is an example of first sensory stimulation in the present disclosure, and the actual sensory stimulation is an example of second sensory stimulation in the present disclosure. Moreover, the sensation corresponding to the original sensory stimulation and the sensation corresponding to the actual sensory stimulation may be basically the same type.

In one example, the output control unit 106 first dynamically determines a conversion technique of the original sensory stimulation relating to each virtual object displayed on the HMD 20e on the basis of a predetermined criterion. Then, the output control unit 106 determines information of actual sensory stimulation by converting the information of original sensory stimulation specified by the determination unit 104 for each virtual object on the basis of the determined conversion technique. Then, the output control unit 106 generates output control information used to cause the stimulation output unit 20 to output the actual sensory stimulation.

Profile of User

Here, the predetermined criterion can include a profile of the user. The profile may include, in one example, information or the like indicating to age, sex, operating skill (whether or not it is a specialized operator, number of times of use, etc.), and tolerance to sensory stimulation (such as tactile stimulation). In one example, in a case where the user is a specialized operator, the output control unit 106 may determine the original sensory stimulation as the actual sensory stimulation without any modification. In a case where the user is a child, the output control unit 106 may determine the sensory stimulation in which the degree of original sensory stimulation is suppressed on the basis of a predetermined conversion formula as the actual sensory stimulation.

Alternatively, the information of the user and the conversion formula can be associated with each other and registered in a predetermined database (not shown). In this case, the output control unit 106 first extracts a conversion formula registered in a predetermined database in association with the relevant user, and then may determine the actual sensory stimulation by converting the information of original sensory stimulation on the basis of the conversion formula.

Context Information

Further, the predetermined criterion can include context information in displaying the virtual object. Here, the context information may be information indicating the user's usage situation relating to an application corresponding to the picture displayed on the HMD 20e. In one example, in a case where the context information indicates that the user desires to more accurately reproduce skin sensation, the output control unit 106 may determine the original sensory stimulation as the actual sensory stimulation with little change. In addition, in a case where the context information indicates that the user desires to obtain more detailed information relating to skin sensation within a particular range, the output control unit 106 may convert the degree of the original skin sensation (corresponding to original tactile stimulation) and then may determine tactile stimulation corresponding to the converted skin sensation as the actual tactile stimulation.

Alternatively, the context information may be information indicating a usage mode that is set with respect to the application. Here, the usage mode may include, in one example, an inspection mode and a normal mode. Moreover, the inspection mode can be used, in one example, in a scene where a temperature of oil at the time of food processing is inspected at a remote place, a scene in which the inspection is virtually experienced, or the like. In one example, in a case where the usage mode is set to the inspection mode, the output control unit 106 may determine the original sensory stimulation (e.g., heat, etc.) as the actual sensory stimulation without any modification. In addition, in a case where the usage mode is the normal mode, the output control unit 106 may determine the sensory stimulation in which the degree of original sensory stimulation is suppressed on the basis of a predetermined conversion formula as the actual sensory stimulation.

Degree of Original Sensory Stimulation

Further, the predetermined criterion may include that the degree of original sensory stimulation is larger than or equal to a predetermined threshold value. In one example, in a case where a severe collision occurs in a VR car racing game, a sports game, or the like, a case where a gun is fired in a game, or the like, if original pressure sensation corresponding to such an event is presented to the user without any modification, the user is likely to be injured. Thus, in the case where the degree of original stimulation relating to pressure sensation is larger than or equal to a predetermined threshold value, the output control unit 106 suppresses the original stimulation so that pressure sensation within a range not affecting the human body is presented, and causes the tactile stimulation unit 20 (e.g., the tactile stimulation unit 20b illustrated in FIG. 1) to output the suppressed stimulation (as actual tactile stimulation). This makes it possible to present the skin sensation within the range that can be enjoyed as a game to the user.

Further, in a case where the luminance associated with the virtual object is larger than or equal to a predetermined threshold value or a case where the sound volume associated with the virtual object (e.g., sound volume output from a loudspeaker in the virtual space, etc.) is larger than or equal to a predetermined threshold value, if the original luminance or the original sound volume is presented to the user without any modification, it can be harmful to the user. Thus, in such cases, the output control unit 106 is capable of suppressing the original luminance and the original volume that are (only) associated with the virtual object so that they may be values within a range not affecting the human body. In other words, the output control unit 106 is capable of independently controlling the luminance or related sound volume of each virtual object while maintaining the luminance of the display unit and the sound volume outputted from the sound output unit 20 as a whole. Then, the output control unit 106 is capable of causing the HMD 20e to display the virtual object with the suppressed luminance and causing the sound output unit 20 to output the suppressed sound volume. Moreover, in order to improve the user's convenience, the independently controlled parameters of the virtual object may be grouped for each type of the virtual object. The type of the virtual object is preferably grouped depending on the type of sensory stimulation and the intensity of sensory stimulation, in one example, "luminous body", "weapon (especially, firearm)", or the like.

Detailed Example of Conversion Technique

Figure 4:
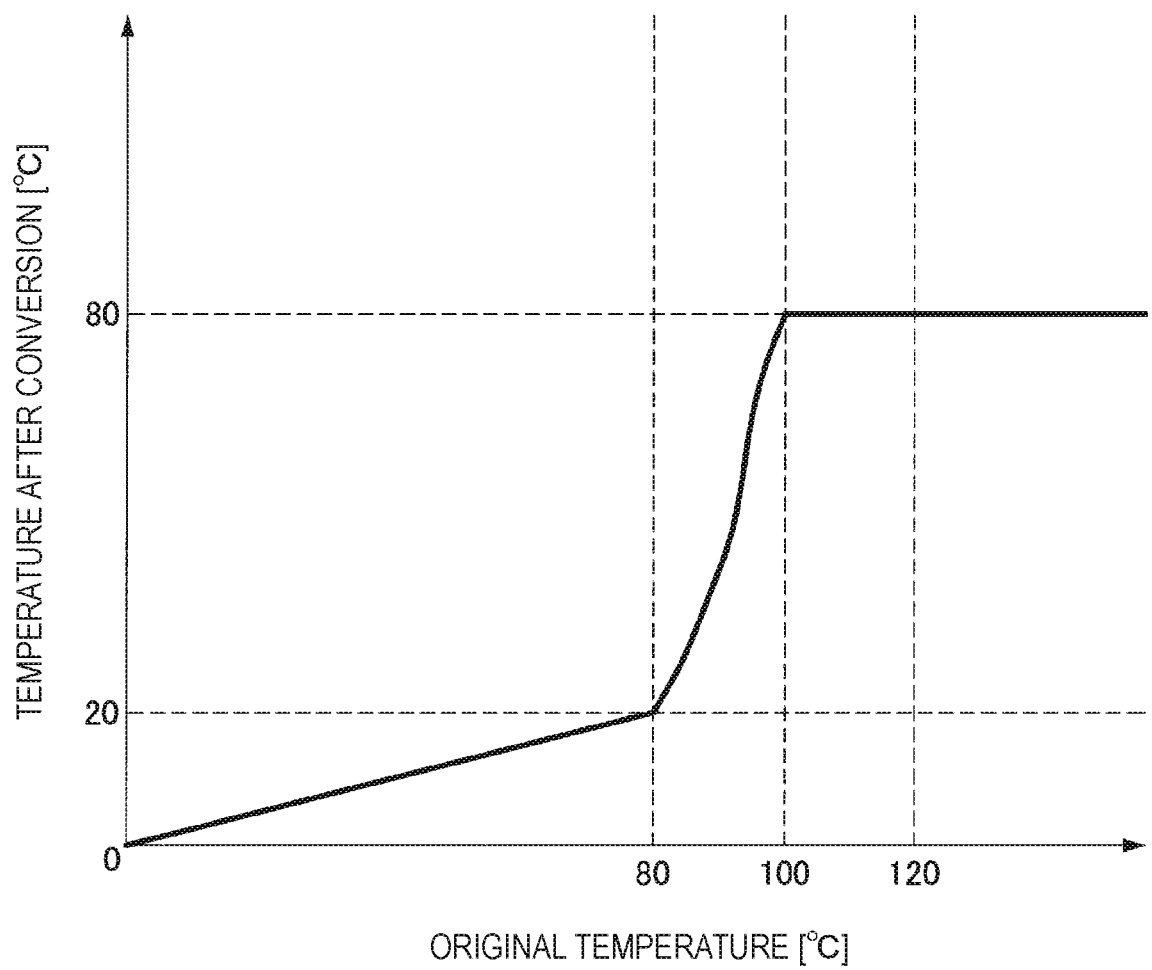
FIG. 4 is a graph illustrating an example of a relationship between an original temperature and an actual temperature.

A detailed example of the conversion technique of sensory stimulation is now described with reference to FIG. 4. FIG. 4 is a graph illustrating, when the user touches the virtual object displayed on the HMD 20e, an example of the relationship between an original temperature corresponding to the contact position and a converted temperature (actual temperature) from the original temperature. In the example illustrated in FIG. 4, when the original temperature is higher than or equal to 80° C. and lower than or equal to 100° C., the output control unit 106 uses a nonlinear conversion formula to convert the original temperature to a temperature higher than or equal to 20° C. and lower than or equal to 80° C., and then determines tactile stimulation corresponding to the converted temperature as the actual tactile stimulation. On the other hand, in a case where the original temperature is higher than 100° C., the output control unit 106 (uniformly) determines tactile stimulation corresponding to "80° C." as the actual tactile stimulation. According to this conversion example, the user is able to obtain more detailed information from a change in temperatures within a particular range (i.e., "80° C. or more and 100° C. or less"). In addition, the upper limit value ("80° C.") of the temperature to be presented is set, so it is possible to secure safety, in one example, when a user who is not a specialized operator touches the virtual object.

(2-1-4-4. Control of Display of Additional Image)

Further, the output control unit 106 is capable of controlling the display, by the stimulation output unit 20, of the additional image corresponding to the output control information of sensory stimulation. Here, the additional image can include a first indication indicating the degree of original sensory stimulation and a character string or an image indicating that the original sensory stimulation is being converted (suppressed or enhanced). In addition, the additional image can further include a second indication indicating the degree of actual sensory stimulation (being outputted by the stimulation output unit 20). Here, the degree of sensory stimulation can be, in one example, a level (degree) of the intensity of sensory stimulation or a value of the intensity of sensory stimulation. Alternatively, the additional image may include an indication indicating a degree of difference between the original sensory stimulation and the actual sensory stimulation (e.g., difference level, difference value, ratio (percentage) of the degree of actual sensory stimulation to the degree of original sensory stimulation, etc.).

In one example, the output control unit 106 causes the HMD 20e to display the additional image in association with a display position of the virtual object on the HMD 20e. As an example, the output control unit 106 causes the HMD 20e to display the additional image in the vicinity of the display position of the virtual object. Alternatively, in a case where it is determined that the user touches the virtual object displayed on the HMD 20e, the output control unit 106 causes the HMD 20e to display the additional image in association with a position in the virtual object that is determined to touch the virtual object. Moreover, if the additional image is labeled so that the user is able to recognize the association relationship between the virtual object and the additional image, the positional relationship between the virtual object and the additional image may be regarded as being not particularly limited.

Display Example 1

Figure 5:
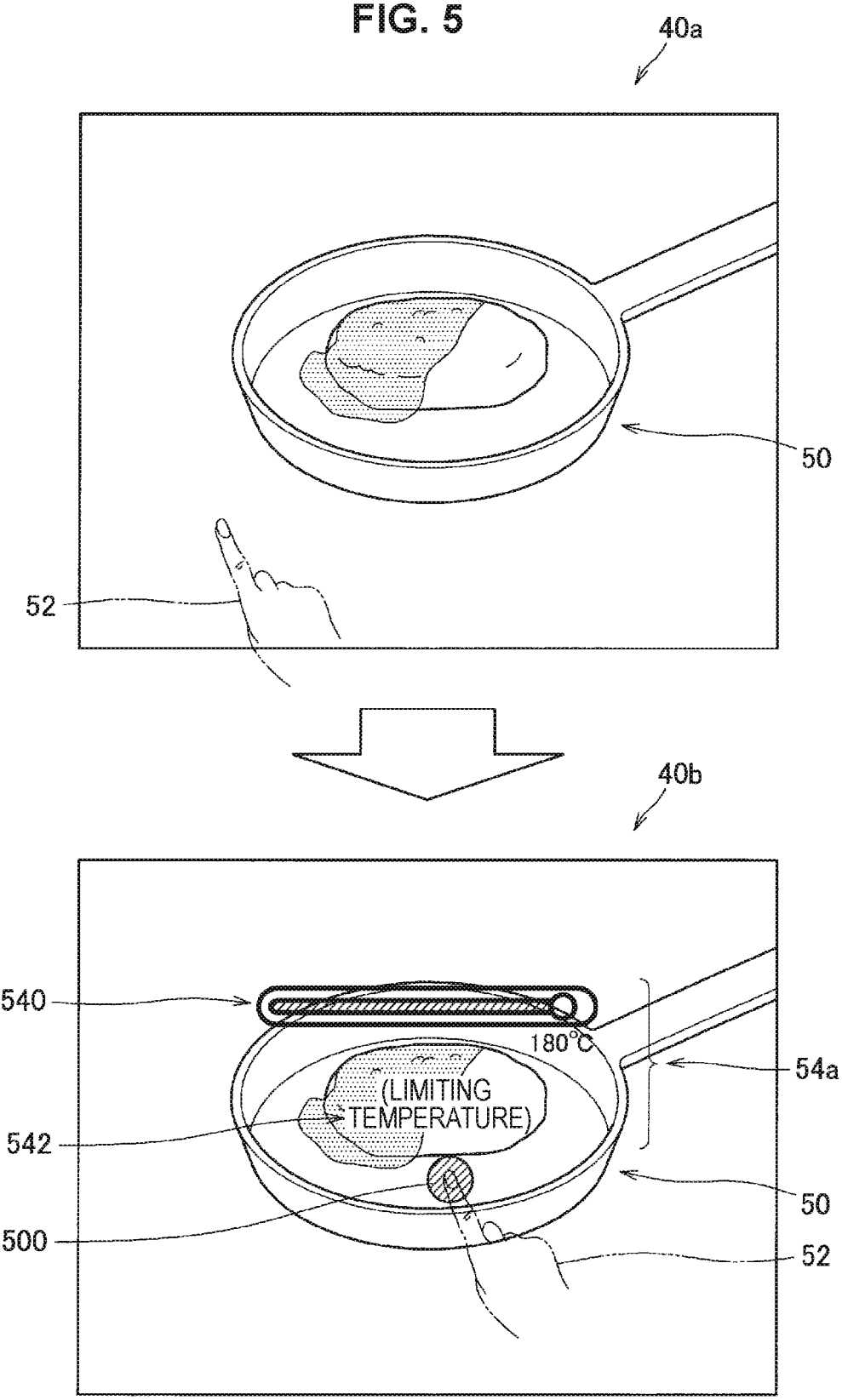
FIG. 5 is a diagram illustrating a display example of an additional image in determining that a user touches a virtual object.

FIG. 5 is a diagram illustrating a display example (additional image 54a) of an additional image 54 in determining that the user touches a virtual object 50 (a virtual frying pan) in a picture 40 displayed on the HMD 20e. Moreover, a virtual hand 52 can be displayed in the picture 40 in response to a result obtained by recognition of the user's hand in the real space as illustrated in FIG. 5. In one example, the picture 40 is associated with the three-dimensional virtual space, and the virtual hand 52 is displayed at the position in the virtual space corresponding to the position of the user's hand recognized in the real space.

In determining that the user touches the virtual object 50 as illustrated in a picture 40b of FIG. 5, the output control unit 106 superimposes the additional image 54a on the picture 40b and causes the HMD 20e to display the resultant image. In one example, as illustrated in FIG. 5, the output control unit 106 causes the additional image 54a to be displayed in the vicinity of a position 500 where the user touches the virtual object 50.

Moreover, as illustrated in FIG. 5, the additional image 54a includes an indication 540 indicating the original temperature corresponding to the position 500 where the user touches the virtual object 50 and an indication 542 indicating that the original temperature is suppressed and presented (i.e., a temperature lower than the original temperature is presented). Moreover, as illustrated in FIG. 5, the indication 540 may include an indicator (e.g., a meter, etc.) that indicates the degree of temperature or may include only a character string indicating a temperature value (i.e., "180° C."). Moreover, in a case where the indication 540 includes an indicator, the display mode (e.g., length, color, or the like of the indicator) of the indicator is dynamically changed depending on the degree of temperature. In addition, as illustrated in FIG. 5, the additional image 54a may further include an image (e.g., a circle, etc.) indicating the contact position 500. This makes it possible for the user to accurately recognize the position 500 where the user touches the virtual object 50.

Modification

Moreover, in a case of determining that the user touches one or more virtual objects 50 displayed on the HMD 20e with both hands, an additional image 54 indicating the degree of original sensory stimulation corresponding to the position where the hand touches may be displayed for each hand in the vicinity of the contact positions of the hands. Moreover, an example of such a case includes a case where each hand touches independently a virtual object, a case where both hands touch the same virtual object, or the like.

Display Example 2

Figure 6:
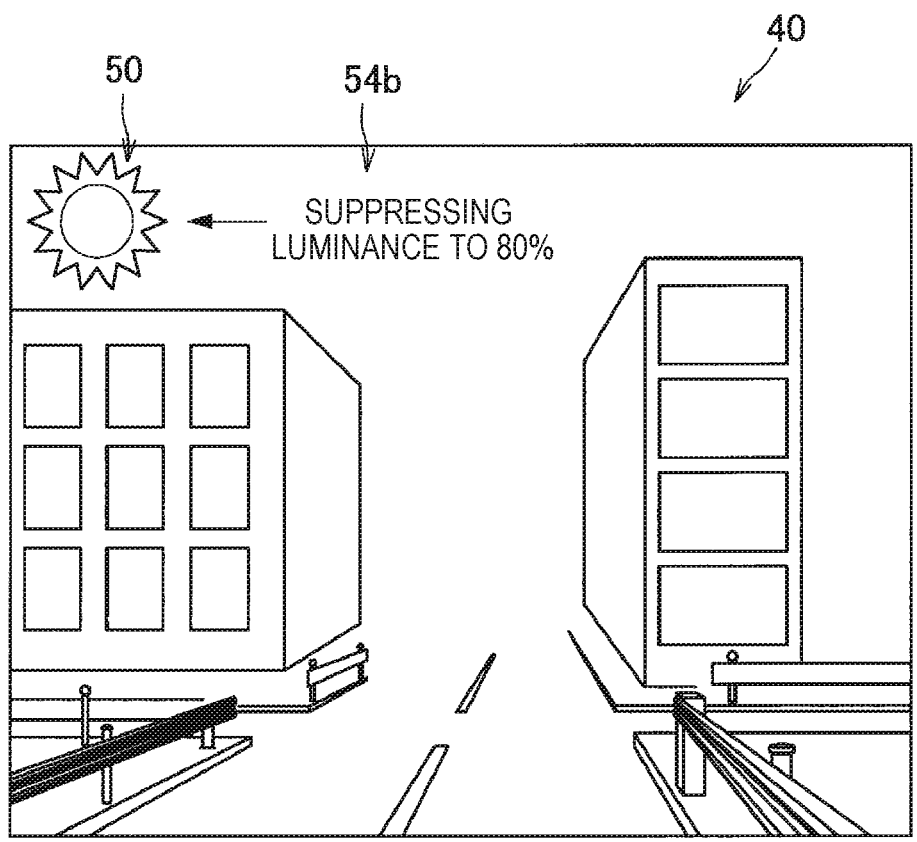
FIG. 6 is a diagram illustrating a display example of an additional image in displaying a predetermined virtual object by an HMD 20*e*.

Further, FIG. 6 is a diagram illustrating a display example (additional image 54b) of the additional image 54 in displaying the predetermined virtual object 50 (virtual sun 50) by the HMD 20e. Moreover, in the example illustrated in FIG. 6, it is assumed that the original luminance associated with the virtual sun 50 is large, in one example, to the extent that it is excessive with respect to the vision of a user such as a child. In addition, the example illustrated in FIG. 6 illustrates that the output control unit 106 suppresses the original luminance to 80% and causes the HMD 30 to display the virtual sun 50. In this case, as illustrated in FIG. 6, the output control unit 106 may cause the additional image 54b including a character string indicating "luminance of the virtual sun 50 is suppressed to 80%" to be displayed in the vicinity of the display position of the virtual sun 50.

Display Example 3

Figure 7:
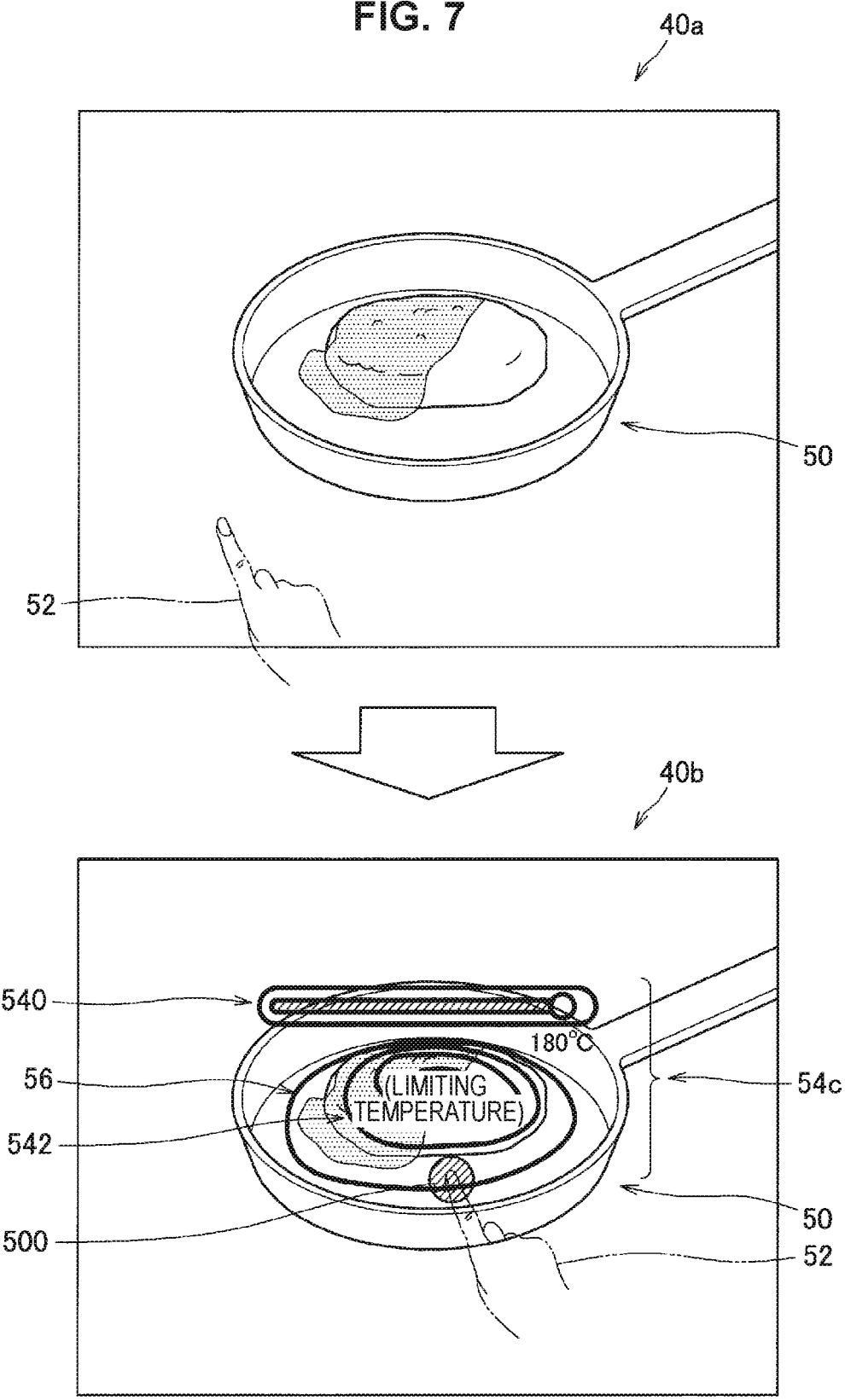
FIG. 7 is a diagram illustrating another display example of the additional image in determining that a user touches a virtual object.

Further, FIG. 7 is a diagram illustrating another display example (additional image 54c) of the additional image 54 in determining that the user touches the virtual object 50 displayed on the HMD 20e. As illustrated in FIG. 7, the additional image 54c further includes an indication 56 indicating the distribution of skin sensation (e.g., temperature, etc.) that can be presented at each position in the virtual object 50 (in comparison with the additional image 54a illustrated in FIG. 5). In one example, as illustrated in FIG. 7, the indication 56 may include a contour line indicating the temperature of each position in the virtual object 50. This makes it possible for the user to recognize the relationship between the temperature of the position 500 where the user currently touches the virtual object 50 and the temperature around the contact position 500 at the same time.

Display Example 4

Figure 8:
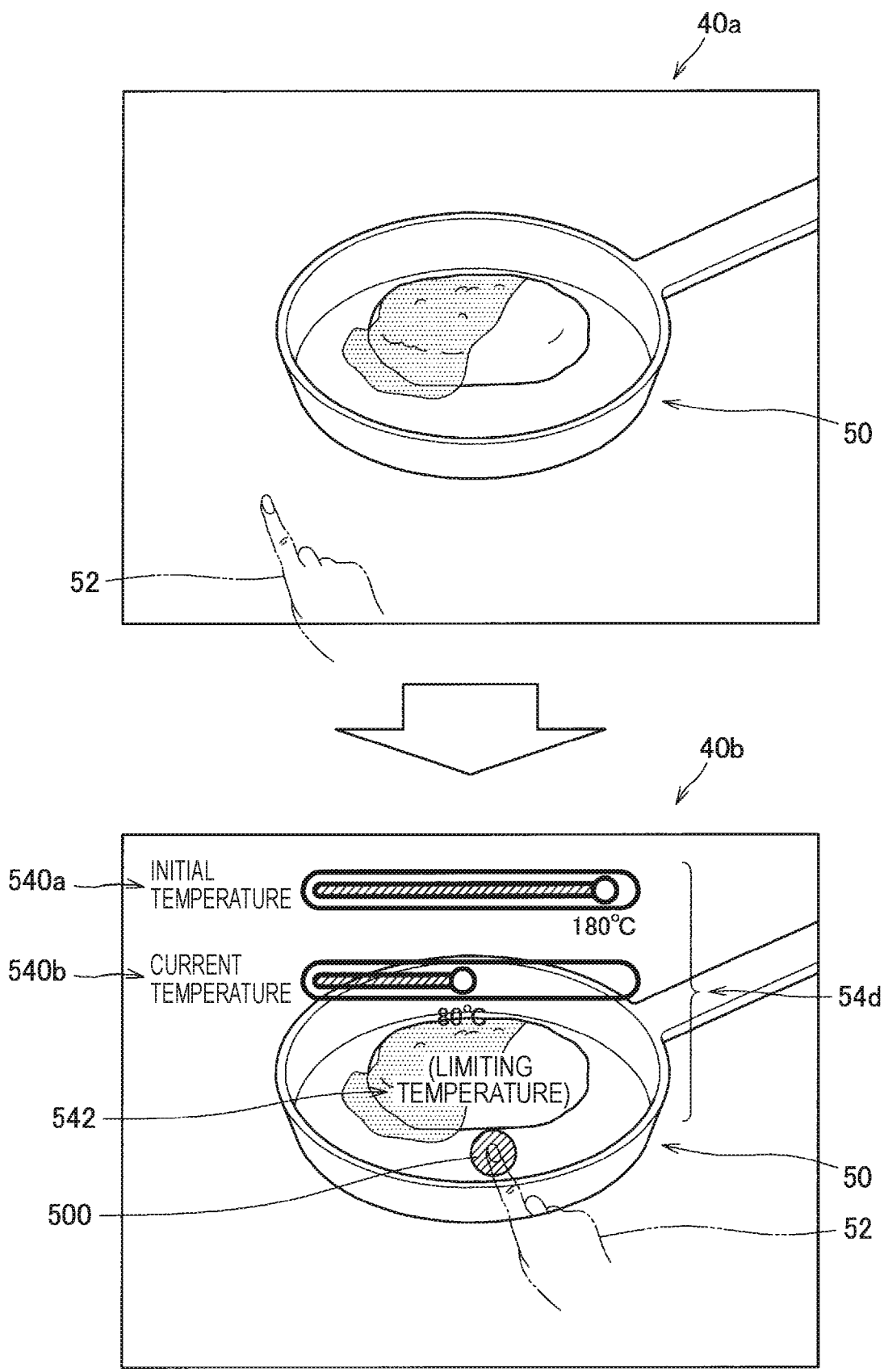
FIG. 8 is a diagram illustrating another display example of the additional image in determining that a user touches a virtual object.

Further, FIG. 8 is a diagram illustrating still another display example (additional image 54d) of the additional image 54 in determining that the user touches the virtual object 50 displayed on the HMD 20e. As illustrated in FIG. 8, the additional image 54d further includes an indication 540b indicating the temperature actually presented by the stimulation output unit 20 (in comparison with the additional image 54a illustrated in FIG. 5). In one example, as illustrated in FIG. 8, the output control unit 106 may cause the indication 540a indicating the original temperature and the indication 540b indicating the actual temperature to be displayed in the picture 40b so that they are arranged side by side. According to this display example, the user is able to recognize the original temperature and the currently presented temperature at the same time. Thus, the user is able to recognize how much the temperature currently felt by the skin differs from the original temperature (i.e., the initial temperature associated with the virtual object) by browsing the additional image 54a.

(2-1-4-5. Setting Relating to Output of Sensory Stimulation)

Moreover, in one example, the degree of actual sensory stimulation or the above-mentioned predetermined conversion formula may be set in advance on the basis of a user's input on a predetermined setting screen, or may be adjustable in real time. In addition, the additional image 54 may include a graphical user interface (GUI) used to allow the user to specify the type of sensory stimulation (or the sensation to be presented) to be outputted, the degree of sensory stimulation to be outputted, the above-mentioned predetermined conversion formula, or the like. In this case, the type of sensory stimulation to be outputted, the degree of sensory stimulation to be outputted, or the above-mentioned predetermined conversion formula may be adjustable in real time on the basis of the user's operation on the GUI. Here, the GUI is an example of an operation image according to the present disclosure. Moreover, the GUI may be, in one example, an object having a shape such as a slider.

Figure 9:
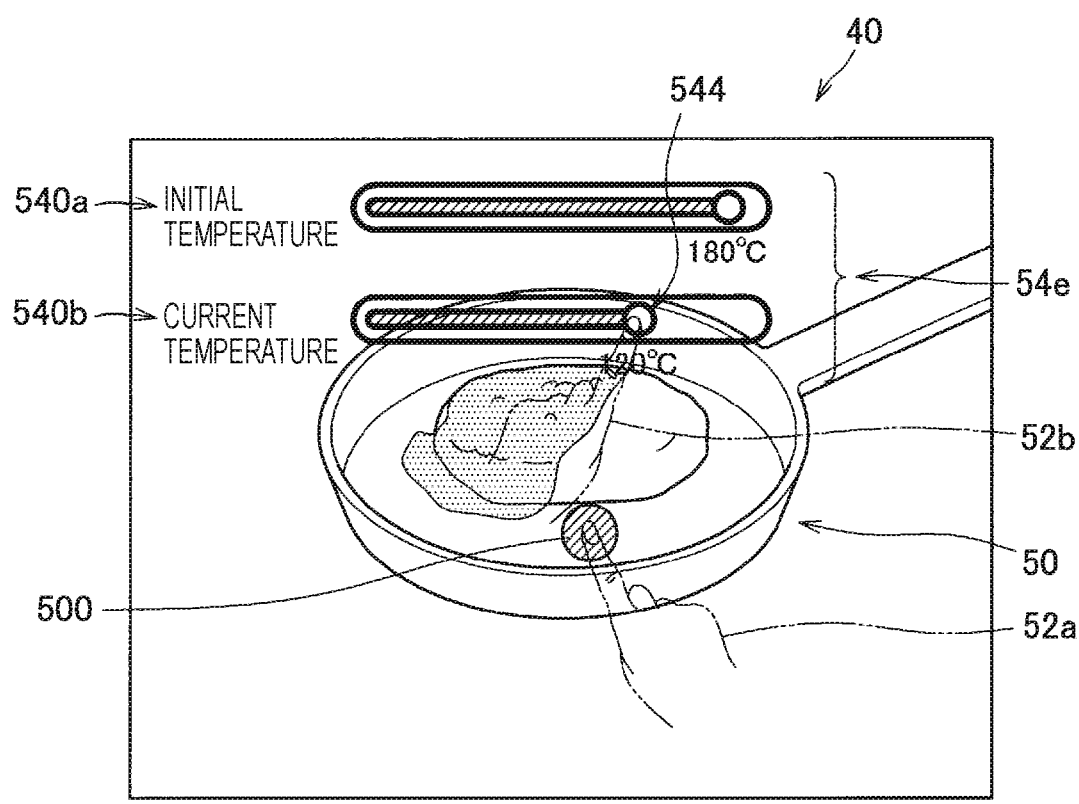
FIG. 9 is a diagram illustrating another display example of the additional image in determining that a user touches a virtual object.

The contents described above are now described in more detail with reference to FIG. 9. FIG. 9 is a diagram illustrating yet another display example (additional image 54e) of the additional image 54 in determining that the user touches the virtual object 50 displayed on the HMD 20e. As illustrated in FIG. 9, the additional image 54e further includes a GUI 544 that allows the user to adjust the temperature of heat outputted by the tactile stimulation unit 20. In the example illustrated in FIG. 9, the output control unit 106 is capable of changing the temperature of heat outputted by the tactile stimulation unit 20 in real time on the basis of the user's operation on the GUI 544. In one example, as illustrated in FIG. 9, in a case where the user moves the GUI 544 with the left hand to a position corresponding to "120° C." while touching the virtual object 50 with the right hand, the output control unit 106 changes the temperature of heat outputted by the tactile stimulation unit 20, in one example, from "80° C." to "120° C.". Moreover, the example illustrated in FIG. 9 is not limited to the example of manually operating the GUI 544, and the GUI 544 may be operable using a predetermined input device (such as joystick).

(2-1-4-6. Control of Output of Alternative Sensory Stimulation)

Further, in a case where sensory stimulation is converted so that the degree of actual sensory stimulation is smaller than the degree of original sensory stimulation by a predetermined threshold value or more with respect to a certain sensory stimulation, or a case where the output of sensory stimulation is stopped, the output control unit 106 is also capable of causing another stimulation output unit 20 to newly output stimulation relating to sensation different from the sensation corresponding to the sensory stimulation as compensation feedback (i.e., as alternative sensory stimulation). In one example, in a case where the tactile stimulation is suppressed so that the degree of actual tactile stimulation is smaller than the degree of the original sensory stimulation by a predetermined threshold value or more, the output control unit 106 may cause the stimulation output unit 20 (i.e., the HMD 20e or the sound output unit 20) corresponding to visual sensation or auditory sensation to newly output a predetermined picture or predetermined sound.

Alternatively, in a case where the sensory stimulation is converted so that the degree of actual sensory stimulation is smaller than the degree of original sensory stimulation by a predetermined threshold value or more with respect to certain sensory stimulation or a case where the output of the sensory stimulation is stopped, the output control unit 106 may cause the stimulation output unit 20 to change the intensity of the stimulation relating to sensation different from the sensation corresponding to the sensory stimulation being currently outputted. In one example, in a case where the tactile stimulation is suppressed so that the degree of actual tactile stimulation is smaller than the degree of original tactile stimulation by a predetermined threshold value or more, the output control unit 106 may change a display mode of the picture displayed on the HMD 20e or may change the sound that is outputted by the HMD 20e or the sound output unit 20.

In one example, in a situation where a user is riding a dedicated motorcycle installed in an amusement park or the like, it is assumed that the electric fan 20c is generating wind corresponding to the traveling wind of the motorcycle depending on the VR picture (such as game) displayed on the HMD 20e. In this case, in a case where the strength (air volume, wind speed, etc.) of wind generated by the electric fan 20c is suppressed to be smaller than the original wind strength by a predetermined threshold value or more, the output control unit 106 may cause wind effect (e.g., shaking the picture being displayed, etc.) to be newly displayed, may change the wind effect to emphasize the effect of the wind currently being displayed, or may an onomatopoeic word indicating that the wind is blowing (e.g., "whir") to be newly displayed with respect to the picture displayed on the HMD 20e. Alternatively, in this case, the output control unit 106 may cause the HMD 20e to newly output the wind effect sound (such as sound of storm) or may change the effect so that the effect sound of the wind currently being output is emphasized. In one example, the output control unit 106 may increase the sound volume of effect sound of the wind currently being output.

{2-1-5. Communication Unit 120}

The communication unit 120 can include, in one example, a communication device 162 described later. The communication unit 120 transmits and receives information to and from other devices. In one example, the communication unit 120 receives the motion information from the stimulation output unit 20. In addition, the communication unit 120 transmits the output control information to the stimulation output unit 20 under the control of the output control unit 106.

{2-1-6. Storage Unit 122}

The storage unit 122 can include, in one example, a storage device 160 described later. The storage unit 122 stores various types of data and various types of software. In one example, as illustrated in FIG. 3, the storage unit 122 stores the object DB 124.

Moreover, the configuration of the information processing device 10 according to the present embodiment is not limited to the example described above. In one example, the object DB 124 may be stored in another device (not shown) connected to the communication network 22 instead of being stored in the storage unit 122.

<2-2. Processing Procedure>

The configuration of the present embodiment is described above. An example of processing procedure according to the present embodiment is now described with reference to FIGS. 10 and 11. Moreover, the following description is give of an example of the processing procedure in a scene where the information processing device 10 causes the HMD 20e to display a picture including a virtual object.

Figure 10:
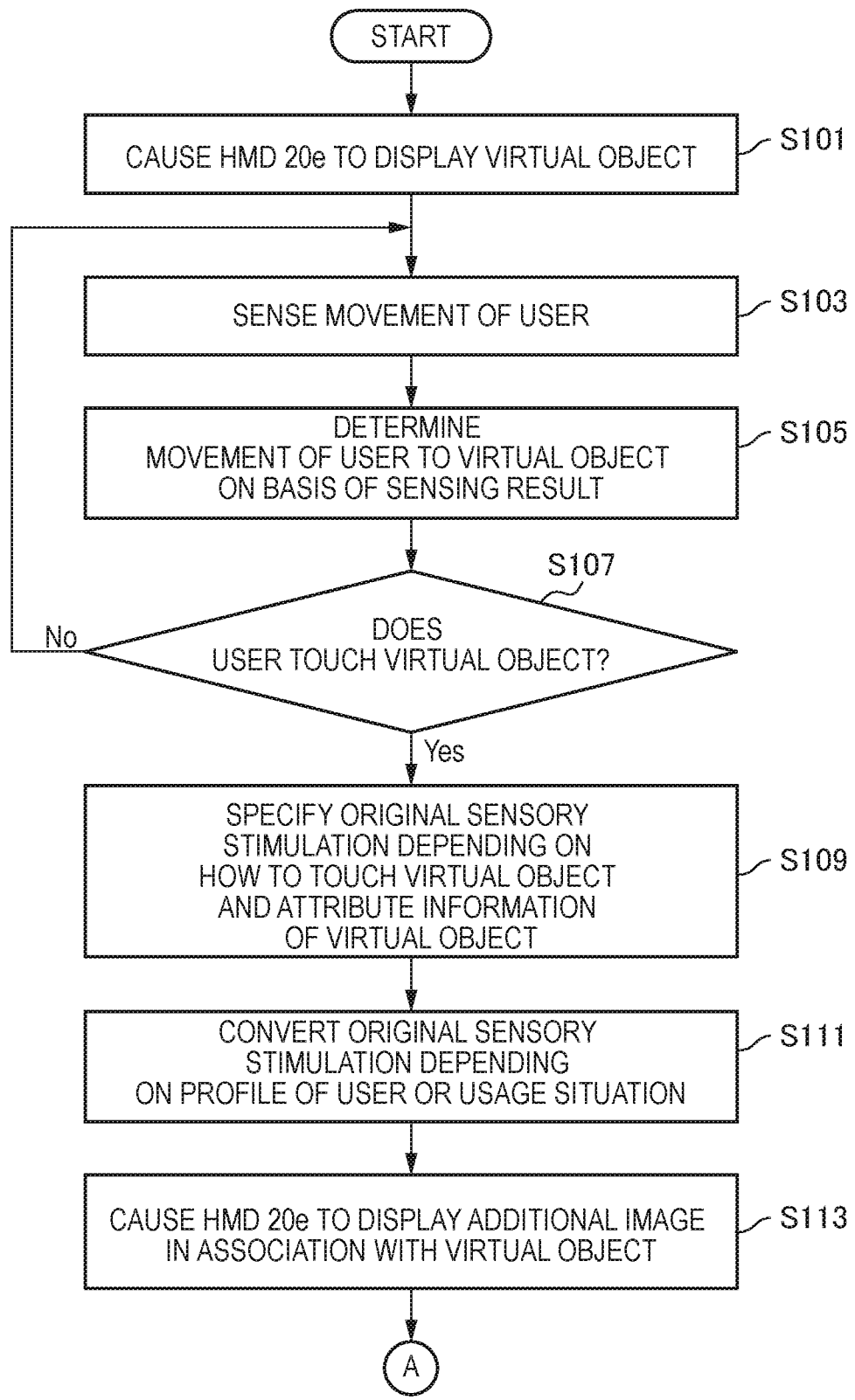
FIG. 10 is a flowchart illustrating a part of the processing procedure according to the present embodiment.

As illustrated in FIG. 10, first, the output control unit 106 of the information processing device 10 causes the communication unit 120 to transmit display control information used to cause the HMD 20e to display a predetermined picture including a virtual object. Then, the HMD 20e displays the predetermined picture depending on the display control information (S101).

Subsequently, the stimulation output unit 20 senses the movement of the user. Then, the stimulation output unit 20 transmits the sensing result as motion information to the information processing device 10 (S103).

Subsequently, the determination unit 104 of the information processing device 10 determines the user's movement to the virtual object displayed on the HMD 20e on the basis of the motion information (S105). Then, if it is determined that the user does not touch the virtual object (No in S107), the processing of S103 is performed again.

On the other hand, if it is determined that the user touches the virtual object (Yes in S107), the output control unit 106 first specifies information of the original sensory stimulation depending on the determination result of how the user touches the virtual object in S105 and attribute information of the virtual object (S109).

Subsequently, the output control unit 106 determines a conversion technique of the original sensory stimulation on the basis of, in one example, a user's profile, current context information, or the like. Then, the output control unit 106 determines information of the actual sensory stimulation by converting the information of the original sensory stimulation using the determined conversion technique (S111).

Subsequently, the output control unit 106 causes the HMD 20e to display an additional image indicating, in one example, the degree of original sensory stimulation or the like in association with the virtual object (S113).

Figure 11:
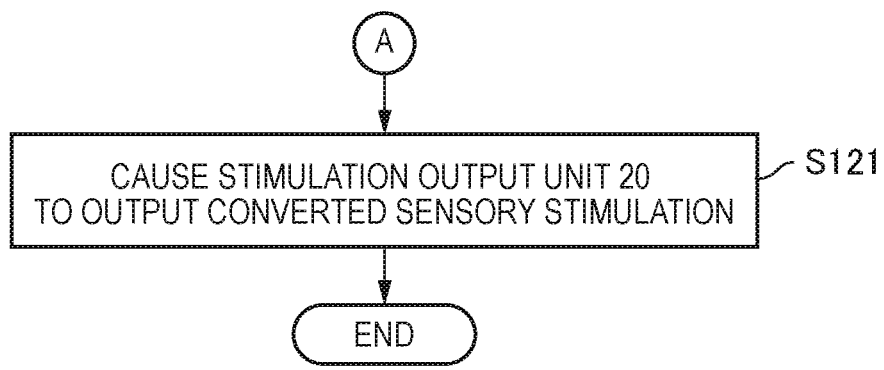
FIG. 11 is a flowchart illustrating a part of the processing procedure according to the present embodiment.

The processing procedure following S113 is now described with reference to FIG. 11. As illustrated in FIG. 11, after performing S113, the output control unit 106 generates output control information used to cause the stimulation output unit 20 to output the sensory stimulation determined in S111. Then, the communication unit 120 transmits the output control information to the stimulation output unit 20 corresponding to the sensory stimulation under the control of the output control unit 106. Then, the stimulation output unit 20 outputs the sensory stimulation depending on the received output control information (S121).

{Modification}

Moreover, the processing procedure according to the present embodiment is not limited to the example described above. A modification of the processing procedure according to the present embodiment is now described with reference to FIG. 12. The processing of S101 to S113 illustrated in FIG. 10 is similar to that of the present modification. The processing procedure following S113 is described below.

After performing S113, the output control unit 106 determines whether or not the difference between the degree of the original sensory stimulation specified in S109 and the degree of the actual sensory stimulation determined in S111 is larger than or equal to a predetermined threshold value (S151). If the difference is smaller than the predetermined threshold value (No in S151), then the output control unit 106 performs the processing of S155 described later.

On the other hand, if the difference is larger than or equal to the predetermined threshold value (Yes in S151), the output control unit 106 generates output control information used to cause stimulation relating to sensation different from the sensation corresponding to the original sensory stimulation to be outputted by the stimulation output unit 20b corresponding to the other sensation. Then, the communication unit 120 transmits the output control information to the stimulation output unit 20b under the control of the output control unit 106 (S153).

Figure 12:
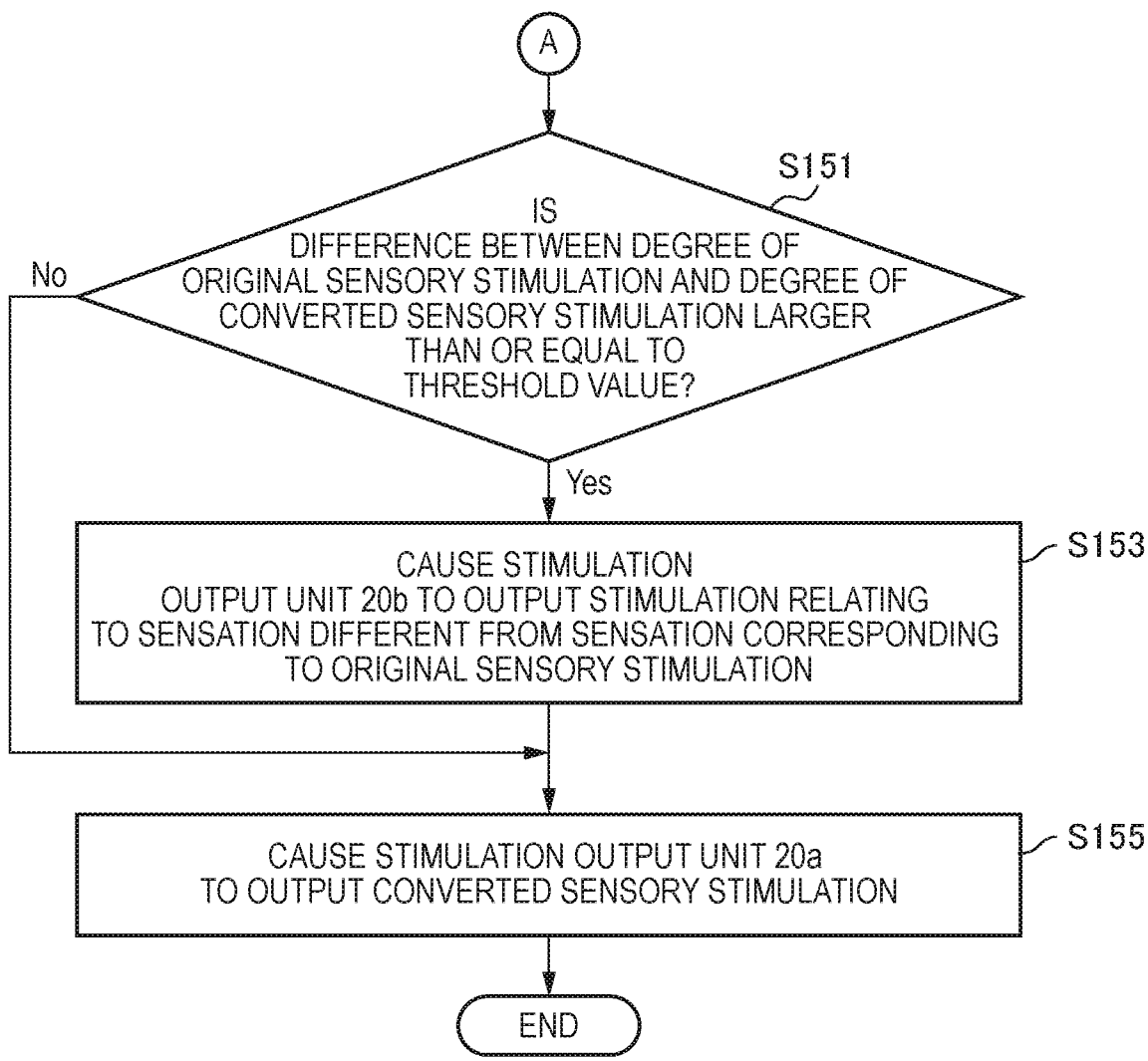
FIG. 12 is a flowchart illustrating a part of a modification of the processing procedure according to the present embodiment.

Moreover, S155 illustrated in FIG. 12 is substantially similar to S121 illustrated in FIG. 11.

<2-3. Advantageous Effects>

{2-3-1. Advantageous Effect 1}

As described above, according to the present embodiment, the information processing device 10 is capable of converting the original sensory stimulation corresponding to the virtual object displayed on the HMD 20e using the conversion technique determined on the basis of the predetermined criterion, and then is capable of causing the stimulation output unit 20 to output the converted sensory stimulation. Thus, it is possible to present an appropriate degree of sensory stimulation to the user.

In one example, in a case where it is determined that the user such as a child touches the virtual object, the information processing device 10 converts the original sensory stimulation into sensory stimulation of the intensity within a range not affecting the human body, and then causes the tactile stimulation unit 20 to output the converted sensory stimulation. Thus, in one example, injury to the user can be prevented.

{2-3-2. Advantageous Effect 2}

Further, according to the present embodiment, the information processing device 10 controls the display, by the stimulation output unit 20, of the additional image corresponding to the control information relating to the output of the sensory stimulation. Thus, it is possible to control the display of the additional image adapted to contents of the control relating to the output of the sensory stimulation.

In one example, the additional image indicates that the original sensory stimulation is suppressed and outputted or indicates the degree of suppression. In addition, the information processing device 10 causes the HMD 20e to display the additional image in association with the virtual object being displayed. Thus, in one example, the user is able to easily recognize the fact that the original sensory stimulation is suppressed and outputted by the stimulation output unit 20, the degree of the original sensory stimulation, or the like.

3. Hardware Configuration

Figure 13:
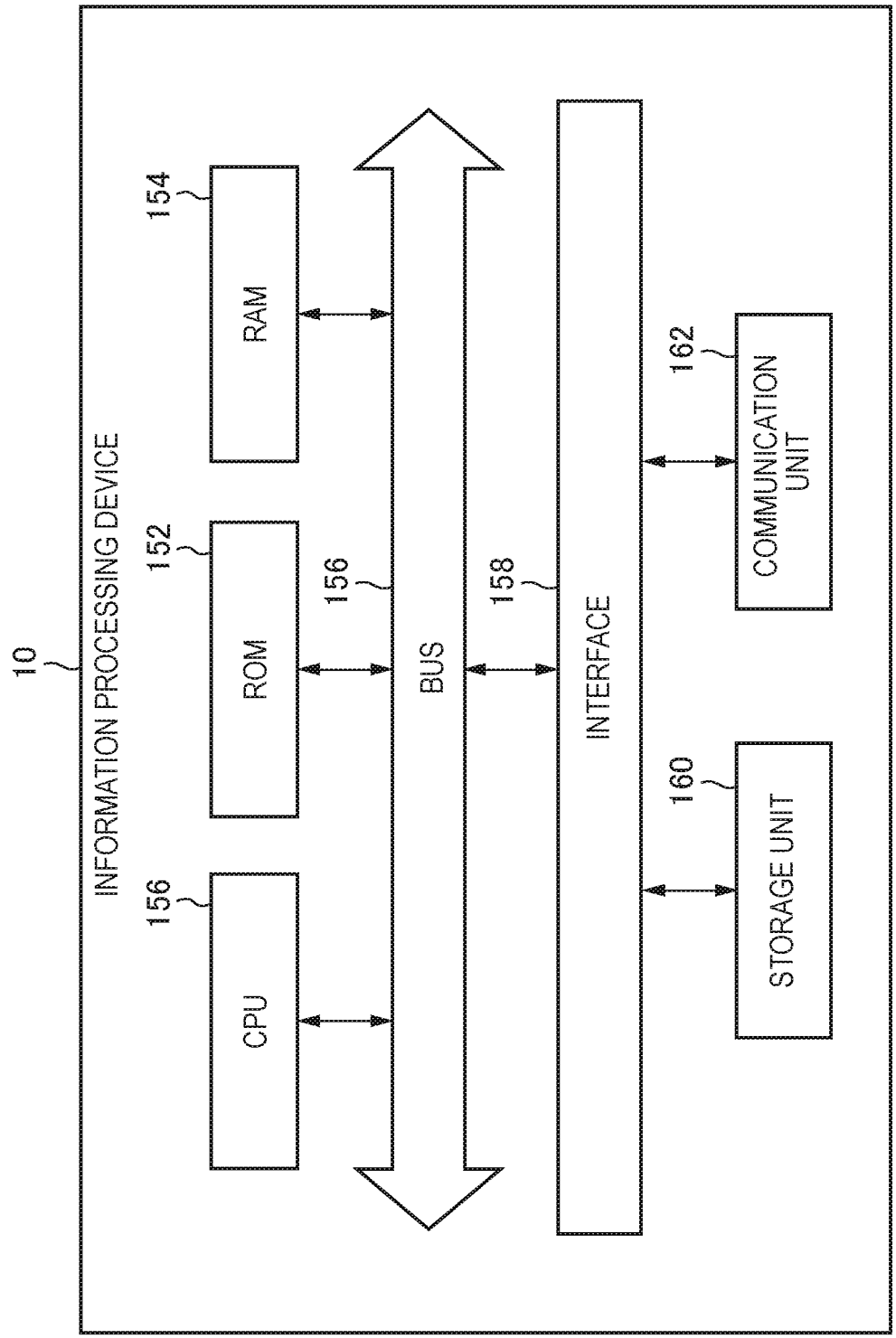
FIG. 13 is a diagram illustrated to describe a hardware configuration example of the information processing device 10 according to the present embodiment.

Next, with reference to FIG. 13, a hardware configuration of the information processing device 10 according to the embodiment will be described. As illustrated in FIG. 13, the information processing device 10 includes a CPU 150, read only memory (ROM) 152, random access memory (RAM) 154, a bus 156, an interface 158, a storage device 160, and a communication device 162.

The CPU 150 functions as an arithmetic processing device and a control device to control all operation in the information processing device 10 in accordance with various kinds of programs. In addition, the CPU 150 realizes the function of the control unit 100 in the information processing device 10. Note that, the CPU 150 is implemented by a processor such as a microprocessor.

The ROM 152 stores control data such as programs and operation parameters used by the CPU 150.

The RAM 154 temporarily stores programs executed by the CPU 150, data used by the CPU 150, and the like, for example.

The bus 156 is implemented by a CPU bus or the like. The bus 156 mutually connects the CPU 150, the ROM 152, and the RAM 154.

The interface 158 connects the storage device 160 and the communication device 162 with the bus 156.

The storage device 160 is a data storage device that functions as the storage unit 122. For example, the storage device 160 may include a storage medium, a recording device which records data in the storage medium, a reader device which reads data from the storage medium, a deletion device which deletes data recorded in the storage medium, and the like.

For example, the communication device 162 is a communication interface implemented by a communication device for connecting with the communication network 22 or the like (such as a network card). In addition, the communication device 162 may be a wireless LAN compatible communication device, a long term evolution (LTE) compatible communication device, or may be a wired communication device that performs wired communication. The communication device 162 functions as the communication unit 120.

4. Modifications

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

<4-1. Modification 1>

In one example, the above-described embodiment is given of the example in which the information processing device 10 (the output control unit 106) causes the HMD 20e to display an additional image corresponding to the control information relating to the output of the sensory stimulation by the stimulation output unit 20. However, the present disclosure is not limited to such an example. In one example, the information processing device 10 (the output control unit 106) may cause the sound output unit 20 (the HMD 20e, an earphone, etc.) to output sound corresponding to the control information relating to the output of the sensory stimulation by the stimulation output unit 20. As an example, as illustrated in FIG. 5, in determining that the user touches the virtual object 50 displayed on the HMD 20e, the output control unit 106 may cause the sound output unit 20 to output (in displaying the virtual object 50) sound indicating the original temperature corresponding to the contact position 500 where the user touches the virtual object 50, sound indicating that the original temperature is being suppressed, or the like. In one example, in this case, the output control unit 106 may cause the sound output unit 20 to output sound such as "initial temperature of the position being touched is 180° C. and the temperature is currently suppressed".

<4-2. Modification 2>

Further, the configuration of the information processing system according to the above-described embodiment is not limited to the example illustrated in FIG. 1. In one example, the HMD 20e and the information processing device 10 may be configured integrally. As an example, each component included in the control unit 100 described above may be included in the HMD 20e. In this case, the information processing device according to the present disclosure may be the HMD 20e. In one example, the HMD 20e can control the output of the tactile stimulation by the tactile stimulation unit 20a to the tactile stimulation unit 20c, and can control the output of the scent by the olfactory stimulation unit 20d.

Further, a projector may be arranged in the real space where the user 2 is located. Then, the information processing device 10 may cause the projector to project a picture including a virtual object or the like on a projection target (e.g., a wall, etc.) in the real space. In the present modification, the display unit in the present disclosure may be a projector. In addition, in this case, the information processing system may not necessarily have the HMD 20e.

<4-3. Modification 3>

In addition, it is not necessary to execute the steps in the above described process according to the embodiment on the basis of the order described above. For example, the steps may be performed in a different order as necessary. In addition, the steps do not have to be performed chronologically but may be performed in parallel or individually. In addition, it is possible to omit some steps described above or it is possible to add another step.

In addition, according to the above described embodiment, it is also possible to provide a computer program for causing hardware such as the CPU 150, ROM 152, and RAM 154, to execute functions equivalent to the structural elements of the information processing device 10 according to the above described embodiment. Moreover, it may be possible to provide a recording medium having the computer program stored therein.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

an output control unit configured to control display of an image corresponding to control information with respect to a first output unit configured to output sensory stimulation to a user.

(2)

The information processing device according to (1), in which the output control unit causes a display unit to display the image in association with a display position of a virtual object on the display unit.

(3)

The information processing device according to (1) or (2), in which the sensory stimulation is stimulation relating to skin sensation, the information processing device further includes a determination unit configured to determine whether or not the user touches a virtual object displayed on a display unit, and the output control unit causes the display unit to display the image in association with a position in the virtual object determined to be touched by the user.

(4)

The information processing device according to (2) or (3), in which the control information is information for causing the first output unit to output second sensory stimulation obtained by converting first sensory stimulation corresponding to the virtual object on the basis of a predetermined conversion technique, and sensation corresponding to the first sensory sensation is identical in type to sensation corresponding to the second sensory sensation.

(5)

The information processing device according to (4), in which the image includes at least one of a first indication indicating a degree of the first sensory stimulation and a second indication indicating a degree of the second sensory stimulation.

(6)

The information processing device according to (5), in which the image further includes the degree of the second sensory stimulation or an operation image for the user to specify the predetermined conversion technique.

(7)

The information processing device according to any one of (4) to (6), in which the first sensory stimulation has intensity different from intensity of the second sensory stimulation.

(8)

The information processing device according to (7), in which the second sensory stimulation has the intensity smaller than the intensity of the first sensory stimulation.

(9)

The information processing device according to any one of (4) to (8), in which the output control unit further causes a second output unit to output third sensory stimulation to the user in a case where the first sensory stimulation is converted such that a degree of the second sensory stimulation is smaller than a degree of the first sensory stimulation by a predetermined threshold value or more, and first sensation corresponding to the first sensory stimulation and the second sensory stimulation is different in type from second sensation corresponding to the third sensory stimulation.

(10)

The information processing device according to any one of (4) to (8), in which the output control unit causes a second output unit to change intensity of third sensory stimulation being outputted by the second output unit in a case where the first sensory stimulation is converted such that a degree of the second sensory stimulation is smaller than a degree of the first sensory stimulation by a predetermined threshold value or more, and first sensation corresponding to the first sensory stimulation and the second sensory stimulation is different in type from second sensation corresponding to the third sensory stimulation.

(11)

The information processing device according to (9) or (10), in which the first sensation is skin sensation, and the second sensation is visual sensation or auditory sensation.

(12)

The information processing device according to any one of (4) to (11), in which the output control unit further determines the predetermined conversion technique on the basis of a predetermined criterion and generates the control information.

(13)

The information processing device according to (12), in which the predetermined criterion includes a profile of the user.

(14)

The information processing device according to (12) or (13), in which the predetermined criterion includes context information at a time of display of the virtual object.

(15)

The information processing device according to any one of (12) to (14), in which the predetermined criterion includes a degree of the first sensory stimulation.

(16)

The information processing device according to any one of (12) to (15), in which the sensory stimulation is stimulation relating to skin sensation, the information processing device further includes a determination unit configured to determine whether or not the user touches the virtual object, and the output control unit generates the control information when it is determined that the user touches the virtual object.

(17)

The information processing device according to any one of (12) to (16), in which the output control unit further causes a communication unit to transmit the control information to the first output unit.

(18)

The information processing device according to any one of (1) to (17), in which the control information includes information relating to an output amount of the sensory stimulation, and the output control unit causes display of the image to be changed on the basis of the output amount of the sensory stimulation.

(19)

An information processing method including:

controlling, by a processor, display of an image corresponding to control information with respect to a first output unit configured to output sensory stimulation to a user.

(20)

A program causing a computer to function as:
an output control unit configured to control display of an image corresponding to control information with respect to a first output unit configured to output sensory stimulation to a user.

REFERENCE SIGNS LIST 10 information processing device
20 stimulation output unit
20e HMD
22 communication network
100 control unit
102 information acquisition unit
104 determination unit
106 output control unit
120 communication unit
122 storage unit
124 object DB

The invention claimed is:

1. An information processing device, comprising:
a processor configured to:
control a display screen to display a virtual object;
convert a first sensory stimulation corresponding to the virtual object to a second sensory stimulation based on a specific conversion technique, wherein the first sensory stimulation and the second sensory stimulation are different temperatures felt by a user while the user touches the virtual object;
control the display screen to display an image corresponding to control information, wherein the image includes:
a first indication indicating a degree of the first sensory stimulation and a second indication indicating a degree of the second sensory stimulation; and
an operation image that includes a graphical user interface (GUI) for user adjustment of the degree of the second sensory stimulation, wherein the operation image is different from the virtual object;
control reception of a first user operation on the GUI of the operation image, wherein
the received first user operation corresponds to movement of the GUI,
the movement of the GUI corresponds to the user adjustment of the degree of the second sensory stimulation, and
the first user operation is received from the user on the GUI;
change the degree of the second sensory stimulation based on the movement of the GUI, wherein the operation image displays a value of the changed degree of the second sensory stimulation; and
control output of the second sensory stimulation to the user based on the changed degree of the second sensory stimulation and the control information.

2. The information processing device according to claim 1, wherein the processor is further configured to control the display screen to display the image in association with a display position of the virtual object on the display screen.

3. The information processing device according to claim 1, wherein
the second sensory stimulation is a stimulation relating to a skin sensation, and
the processor is further configured to:
determine the user touches the virtual object at a specific position in the virtual object; and
control the display screen to display the image in association with the specific position in the virtual object.

4. The information processing device according to claim 1, wherein the second sensory stimulation has an intensity smaller than an intensity of the first sensory stimulation.

5. The information processing device according to claim 1, wherein
the processor is further configured to control output of a third sensory stimulation to the user based on the degree of the second sensory stimulation that is smaller than the degree of the first sensory stimulation by a threshold value or more, and
a first sensation corresponding to the first sensory stimulation and the second sensory stimulation are different in type from a second sensation corresponding to the third sensory stimulation.

6. The information processing device according to claim 5, wherein
the first sensation is a skin sensation, and
the second sensation is one of a visual sensation or an auditory sensation.

7. The information processing device according to claim 1, wherein
the processor is further configured to control a change of an intensity of a third sensory stimulation based on the degree of the second sensory stimulation that is smaller than the degree of the first sensory stimulation by a specific threshold value or more, and
a first sensation corresponding to the first sensory stimulation and the second sensory stimulation are different in type from a second sensation corresponding to the third sensory stimulation.

8. The information processing device according to claim 1, wherein the processor is further configured to:
determine the specific conversion technique based on a specific criterion; and
generate the control information based on the determined specific conversion technique.

9. The information processing device according to claim 8, wherein the specific criterion includes a profile of the user.

10. The information processing device according to claim 8, wherein the specific criterion includes context information at a time of the display of the virtual object.

11. The information processing device according to claim 8, wherein the specific criterion includes the degree of the first sensory stimulation.

12. The information processing device according to claim 8, wherein
the second sensory stimulation is a stimulation relating to a skin sensation, and
the processor is further configured to:
determine the user touches the virtual object; and
generate the control information based on the determination that the user touches the virtual object.

13. The information processing device according to claim 8, wherein the processor is further configured to control a communication unit to transmit the control information.

14. The information processing device according to claim 1, wherein
the control information includes information relating to an output amount of the second sensory stimulation, and
the processor is further configured to change the display of the image based on the output amount of the second sensory stimulation.

15. The information processing device according to claim 1, wherein the processor is further configured to:
  control reception of a second user operation on the virtual object simultaneously with the movement of the GUI; and
  change the degree of the second sensory stimulation based on the reception of the second user operation simultaneously with the movement of the GUI.

16. An information processing method, comprising:
  controlling, by a processor, a display screen to display a virtual object;
  converting, by the processor, a first sensory stimulation corresponding to the virtual object to a second sensory stimulation based on a specific conversion technique, wherein the first sensory stimulation and the second sensory stimulation are different temperatures felt by a user while the user touches the virtual object;
  controlling, by the processor, the display screen to display an image corresponding to control information, wherein the image includes:
    a first indication indicating a degree of the first sensory stimulation and a second indication indicating a degree of the second sensory stimulation; and
    an operation image that includes a graphical user interface (GUI) for user adjustment of the degree of the second sensory stimulation, wherein the operation image is different from the virtual object;
  controlling, by the processor, reception of a user operation on the GUI of the operation image, wherein
    the received user operation corresponds to movement of the GUI,
    the movement of the GUI corresponds to the user adjustment of the degree of the second sensory stimulation, and
    the user operation is received from the user on the GUI;
  changing, by the processor, the degree of the second sensory stimulation based on the movement of the GUI, wherein the operation image displays a value of the changed degree of the second sensory stimulation; and
  controlling, by the processor, output of the second sensory stimulation to the user based on the changed degree of the second sensory stimulation and the control information.

17. A non-transitory computer-readable medium having stored thereon computer-executable instructions which, when executed by a processor, cause the processor to execute operations, the operations comprising:
  controlling a display screen to display a virtual object;
  converting a first sensory stimulation corresponding to the virtual object to a second sensory stimulation based on a specific conversion technique, wherein the first sensory stimulation and the second sensory stimulation are different temperatures felt by a user while the user touches the virtual object;
  controlling the display screen to display an image corresponding to control information, wherein the image includes:
    a first indication indicating a degree of the first sensory stimulation and a second indication indicating a degree of the second sensory stimulation; and
    an operation image that includes a graphical user interface (GUI) for user adjustment of the degree of the second sensory stimulation, wherein the operation image is different from the virtual object;
  controlling reception of a user operation on the GUI of the operation image, wherein
    the received user operation corresponds to movement of the GUI,
    the movement of the GUI corresponds to the user adjustment of the degree of the second sensory stimulation, and
    the user operation is received from the user on the GUI;
  changing the degree of the second sensory stimulation based on the movement of the GUI, wherein the operation image displays a value of the changed degree of the second sensory stimulation; and
  controlling output of the second sensory stimulation to the user based on the changed degree of the second sensory stimulation and the control information.

* * * * *